United States Patent
Tanaka et al.

(10) Patent No.: US 9,037,081 B2
(45) Date of Patent: May 19, 2015

(54) COMMUNICATION DEVICE AND CAR FINDER SYSTEM

(71) Applicant: DENSO CORPORATION, Kariya, Aichi-pref. (JP)

(72) Inventors: Yasuhiro Tanaka, Kariya (JP); Shouji Nasu, Gamagori (JP); Nobuyoshi Nagai, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 13/760,398

(22) Filed: Feb. 6, 2013

(65) Prior Publication Data

US 2013/0210342 A1    Aug. 15, 2013

(30) Foreign Application Priority Data

Feb. 13, 2012   (JP) ................... 2012-028696

(51) Int. Cl.
*H04W 24/00* (2009.01)
*H04W 4/02* (2009.01)

(52) U.S. Cl.
CPC ........................... *H04W 4/02* (2013.01)

(58) Field of Classification Search
CPC ............... H04B 1/3877; H04M 1/6075
USPC ................... 455/456.1, 456.2, 41.1
See application file for complete search history.

(56) References Cited

U.S. PATENT DOCUMENTS

| | | | |
|---|---|---|---|
| 7,519,400 B2* | 4/2009 | Dery | 455/569.2 |
| 7,570,179 B2* | 8/2009 | Chieu et al. | 340/988 |
| 7,885,603 B2* | 2/2011 | Santavicca | 455/41.2 |
| 8,032,278 B2* | 10/2011 | Flick | 701/36 |
| 8,232,897 B2* | 7/2012 | Tieman et al. | 340/990 |
| 2007/0197261 A1* | 8/2007 | Humbel | 455/558 |
| 2008/0064446 A1* | 3/2008 | Camp et al. | 455/565 |
| 2008/0165033 A1* | 7/2008 | Chieu et al. | 340/990 |
| 2008/0192659 A1* | 8/2008 | Santavicca | 370/280 |
| 2009/0002147 A1* | 1/2009 | Bloebaum et al. | 340/466 |
| 2009/0015401 A1* | 1/2009 | Hamzy | 340/539.32 |
| 2009/0243796 A1* | 10/2009 | Tieman | 340/5.72 |
| 2009/0264082 A1* | 10/2009 | Tieman et al. | 455/73 |
| 2011/0112969 A1* | 5/2011 | Zaid et al. | 705/50 |
| 2011/0117933 A1* | 5/2011 | Andersson | 455/456.2 |
| 2011/0257817 A1* | 10/2011 | Tieman | 701/2 |
| 2014/0121890 A1* | 5/2014 | Gercekci | 701/33.2 |

FOREIGN PATENT DOCUMENTS

JP    2007-241472    9/2007

* cited by examiner

*Primary Examiner* — April G Gonzales
(74) *Attorney, Agent, or Firm* — Harness, Dickey & Pierce, PLC

(57) ABSTRACT

A car finder system has a portable terminal that receives a preset operation performed thereon for wirelessly transmitting a preset car finder instruction. A communication device of the car finder system receives the preset car finder instruction from the portable device, and repeatedly transmits a preset car finder signal to an in-vehicle device, which is disposed in a vehicle. The in-vehicle device performs an external notification operation when it receives the preset car finder signal. The communication device ends the transmission of the preset car finder signal when a predetermined condition is met.

18 Claims, 2 Drawing Sheets

COMMUNICATION DEVICE AND CAR FINDER SYSTEM

CROSS REFERENCE TO RELATED APPLICATION

The present application is based on and claims the benefit of priority of Japanese Patent Application No. 2012-28696, filed on Feb. 13, 2012, the disclosure of which is incorporated herein by reference.

TECHNICAL FIELD

The present disclosure generally relates to a car finder system and a communication device for locating a vehicle in a parking garage.

BACKGROUND

Conventionally, a user of a vehicle searches for and finds the parking spot in which his/her vehicle is parked in a large parking garage by operating a predetermined button (e.g., a panic button, a lock-unlock button) of a communication device that is carried by the user. The communication device then sends a predetermined car finder signal (e.g., a panic signal, a lock/unlock signal). In response, an in-vehicle device installed in the vehicle receiving the car finder signal from the communication device performs a predetermined answerback operation (e.g., blinking of a hazard lamp, blowing of a buzzer or a horn) as a notification. For instance, Japanese Patent Laid-Open No. 2007-241472 (JP '472) discloses such a technique. Such a function is designated as a car finder function.

In such a conventional system, one answerback operation in response to a reception of the car finder signal ends rather quickly. Therefore, it may be necessary for the user to repeat the operation by operating the predetermined button of the communication device many times until he/she finally finds the vehicle when the user walks around in search of the vehicle in, for example, the parking garage, which is cumbersome. Further, it may be difficult for the user to repeat the same operation on the communication device in a situation where the user's hands are occupied, for instance, by luggage or holding a child.

SUMMARY

In an aspect of the present disclosure, a communication device may be carried by a user for communicating with a portable terminal that is also carried by the user, and for communicating with an in-vehicle device, which is disposed in a vehicle and outputs a notification, such as blinking lights or horn blow, based on a preset car finder signal transmitted by the communication device. The communication device includes a wireless receiver and a wireless transmitter.

The wireless receiver wirelessly receives a car finder instruction transmitted from the portable terminal based on a preset operation performed on the portable terminal by the user. The wireless transmitter wirelessly transmits the car finder signal to the in-vehicle device in a repeated manner based on the car finder instruction received by the wireless receiver from the portable device.

According to the above configuration, once the user performs a preset operation on the portable terminal, the car finder instruction is transmitted from the portable terminal to the communication device, and the car finder signal is repeatedly transmitted from the communication device to the in-vehicle device. Therefore, when the user is in search of the vehicle, the user can find the vehicle without repeating the same operation on the communication device time after time, which is conventionally required.

In other words, once the preset operation is performed on the portable terminal, the communication device requires no further operation by the user for allowing the user to move around and find the vehicle. Therefore, since the transmission of the car finder signal is automatically repeated without any operation thereafter, the user is able to notice the external notification from the vehicle when he/she comes close to the vehicle. That is, the parking position of the vehicle is found with ease and hassle-free, without conventionally-required repeated operations of the communication device.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Figure 1:
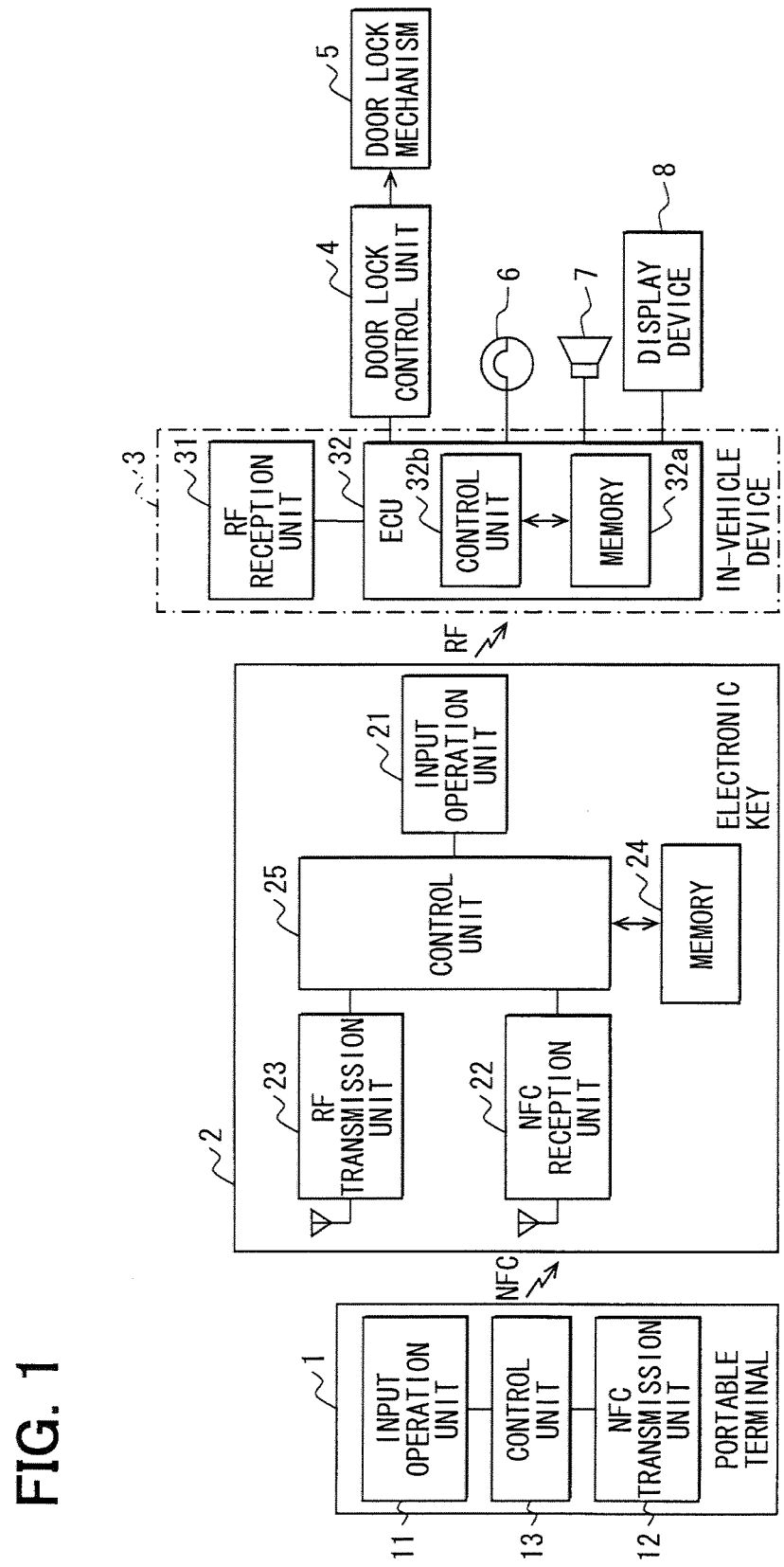
FIG. 1 is a block diagram of a car finder system of the present disclosure.

An embodiment of the present disclosure is described in the following. With reference to FIG. 1, a car finder system in an embodiment of the present disclosure includes a portable terminal 1 carried by a user, an electronic key 2 (i.e., a communication device in claims) carried by the user, and an in-vehicle device 3 installed in a vehicle. The portable terminal 1 is configured to wirelessly transmit a car finder instruction to the electronic key 2, and the electronic key 2 is configured to repeatedly transmit a car finder signal to the in-vehicle device 3.

The portable terminal 1 includes an input operation unit 11 for accepting an operation of the user, a near field communication (NFC) transmission unit 12 for performing communication according to an NFC communication standard, and a control unit 13.

The control unit 13 executes a program stored in a memory, for realizing various functions while performing communication by using the NFC transmission unit 12 as required.

The portable terminal 1 may be implemented as, for example, a handheld device including a smart phone. When the portable terminal 1 is a smart phone, the control unit 13 may perform various well-known processes such as a telephone call process, a Web browsing process, a media playback process, and an application execution process. The telephone call process allows the smart phone to place a phone call by using a telephone call wireless unit, a microphone, and a speaker. The Web browsing process may allow the smart phone to browse a Web page by using the input operation unit 11, the telephone call wireless unit, and a display unit. The media playback process may play back a movie and/or a music piece, and the application execution process may execute an application, such as a game.

The electronic key 2 is a device carried by a user for controlling the lock-unlock of a door of the vehicle, and includes an input operation unit 21, an NFC reception unit 22, a radio frequency (RF) transmission unit 23, a memory 24, and a control unit 25.

The input operation unit 21 has a button that is operable by a user, such as a lock-unlock button and a panic button. The NFC reception unit 22 is a circuit that performs communication according to an NFC standard. The RF transmission unit 23 is a circuit that performs communication in a radio frequency wave band. The memory 24 stores a program that is executed by the control unit 25. By reading a program from the memory 24 and by executing the program, the control unit 25 performs a communication process by using the NFC reception unit 22 and the RF transmission unit 23.

The in-vehicle device 3 has an RF reception unit 31 and an ECU 32. The RF reception unit 31 is a circuit that performs communication in a radio frequency wave band. The ECU 32 has a memory 32*a* and a control unit 32*b*.

The memory 32*a* stores a program that is executed by the control unit 32*b*. The control unit 32*b* controls various devices installed in the vehicle by reading and executing the program in the memory 32*a*. The various in-vehicle devices under control of the control unit 32*b* includes, a door lock control unit 4 that controls a door lock mechanism 5, a hazard lamp 6, a sound blowing device 7 (e.g., a buzzer, a horn, etc.), and a display device 8.

The operation of the car finder system is described in more details in the following.

[Lock and Unlock of the Door]

Lock and unlock operations of the door are described first. When the door of the vehicle is locked, or is unlocked, a press operation of the lock-unlock button of the input operation unit 21 of the electronic key 2, which is performed by the user who is standing outside in the proximity of the vehicle, causes either the door to unlock or lock. Specifically, the press operation of the button of the input operation unit 21 inputs a signal indicative of the press operation on the input operation unit 21 to the control unit 25. The control unit 25 reads a registered ID unique to the key 2 from the memory 24, and generates a predetermined lock/unlock signal that includes the registered ID. Then, the control unit 25 wirelessly transmits the generated lock/unlock signal by using the RF transmission unit 23.

The RF reception unit 31 of the in-vehicle device 3 receives the lock/unlock signal wirelessly transmitted in the RF wave band, and the received signal is then transferred from the RF reception unit 31 to the control unit 32*b*. Based on the acquisition of the lock/unlock signal, the control unit 32*b* either unlocks the door by controlling the door lock mechanism 5 if the door is in a locked state, or locks the door by controlling the door lock mechanism 5 if the door is in an unlocked state.

Further, based on the acquisition of the lock/unlock signal, the control unit 32*b* performs a hazard lamp blinking operation for blinking the hazard lamp 6 on and off once or twice, and performs a horn blowing operation to have the sound blowing device 7 blow a sound for a predetermined time (e.g., 0.5 seconds). In such manner, the user can recognize and confirm a parking position of the vehicle.

[Panic Operation]

A panic operation is described next. The user who carries the portable terminal 1 and the electronic key 2 outside in the proximity of the vehicle presses a panic button of the input operation unit 21 of the electronic key 2. Then, a signal showing that a panic button is pressed is provided from the input operation unit 21 to the control unit 25. Based on the input of such signal, the control unit 25 generates a predetermined panic signal that includes the registered ID that is read from the memory 24, which is unique to the key 2. The control unit 25 transmits the panic signal by using the RF transmission unit 23.

The panic signal transmitted in an RF wave band is received by the RF reception unit 31 of the in-vehicle device 3, and the control unit 32*b* acquires the panic signal from the RF reception unit 31. Based on the acquisition of the panic signal, the control unit 32*b* performs a hazard lamp blinking operation for blinking the hazard lamp 6 on and off a few times (e.g., five times) and a horn blowing operation to have the sound blowing device 7 output sound for a predetermined time (e.g., 1 minute). In such manner, the user can recognize and confirm a parking position of the vehicle.

[Wirelessly-Triggered Car Finder Operation]

The wirelessly-triggered car finder operation is described in the following. In the operation, based on an input of a predetermined car finder operation on the portable terminal 1, a predetermined car finder instruction is configured to be wirelessly transmitted from the portable terminal 1 to the electric key 2. The electric key 2 receiving such instruction then transmits a predetermined car finder signal intermittently to the in-vehicle device 3 in a repeated manner. The in-vehicle device 3 receiving the car finder signal then performs a predetermined answerback operation upon receiving the signal.

More practically, the user who carries both of the portable terminal 1 and the electronic key 2, first performs a predetermined operation on the input operation unit 11 of the portable terminal. The predetermined operation is performed to invoke a car finder application, in order to find a parking position of the vehicle in, for example, a large parking garage, with the portable terminal 1 brought close to the electronic key 2 (e.g., within 10 cm).

Figure 2:
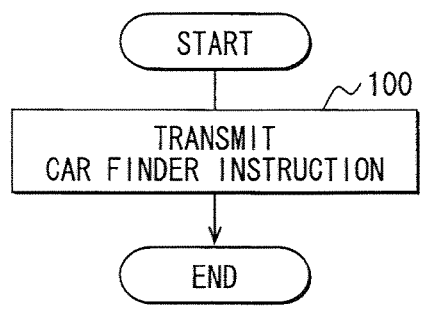
FIG. 2 is a flowchart of a process performed by a portable terminal of the car finder system.

When a signal corresponding to such operation is provided to the control unit 13 from the input operation unit 11, the control unit 13 invokes the predetermined car finder application, and performs a process shown in FIG. 2. In other words, the control unit 13 generates a predetermined car finder instruction at 100, and wirelessly transmits the car finder instruction by using the NFC transmission unit 12.

The wireless transmission of the car finder instruction by using the NFC transmission unit 12 is performed based on a well-known NFC standard. For example, the electric power required for the operation (i.e., the amplification, the reception, the transmission etc.) of the NFC reception unit 22 is supplied from the NFC transmission unit 12 for the NFC reception unit 22 of the electronic key 2 by a non-contact electric power transmission with an electromagnetic induction method. Further, at a time of transmission of the car finder instruction, the NFC transmission unit 12 and the NFC reception unit 22 may exchange signals both ways (e.g., in a round-trip manner), to authorize the car finder instruction.

Figure 3:
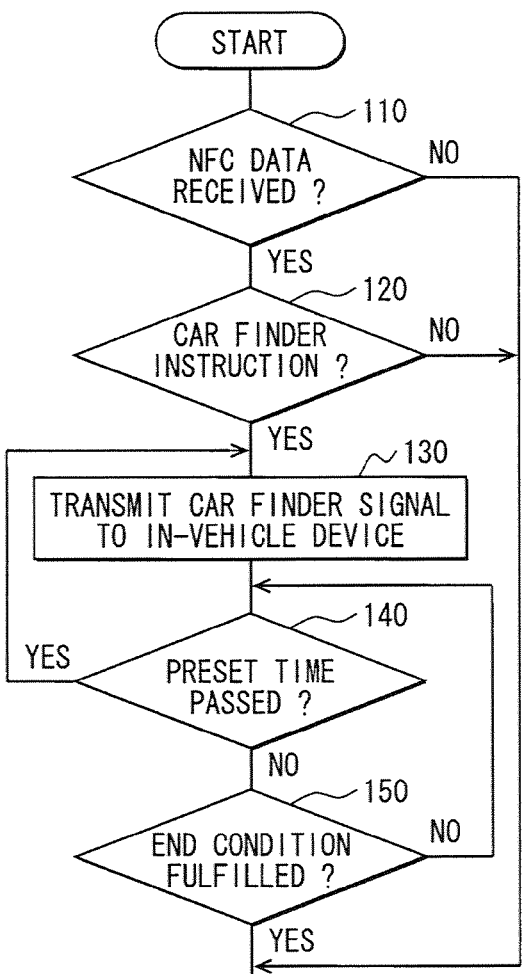
FIG. 3 is a flowchart of a process performed by an electronic key of the car finder system.

The car finder instruction is then received by the NFC reception unit 22 and provided to the control unit 25 of the electronic key 2. With reference to FIG. 3, the control unit 25 executes a process, which is read from the memory 24. Specifically, at 110 the control unit 25 determines whether it has received the NFC data, i.e., whether the NFC data is input from the NFC reception unit 22. The control unit 25 waits (i.e., repeats 110) unit the NFC data is received from the NFC reception unit 22. When the signal of the car finder instruction is provided from the NFC reception unit 22, the control unit 25 determines whether the car finder instruction is received at 120.

The control unit 25 determines whether the input signal includes a predetermined car finder instruction at 120, and either returns to 110 if the instruction is not included therein, or proceeds to 130 if the instruction is included therein. In this example, since the input signal includes the car finder instruction, the control unit 25 proceeds to 130.

The control unit 25 reads the registered ID from the memory 24, and generates the predetermined car finder signal that includes the just-read registered ID at 130. The control unit 25 then wirelessly transmits the car finder signal generated by using the RF transmission unit 23. The car finder signal may be the same as the lock/unlock signal, or the same as the panic signal, or may be different from the lock/unlock signal and from the panic signal. The transmission of the car finder signal at this point corresponds to a start of the repeated transmission of the car finder signal. In such manner, the wireless transmission of the car finder signal in the RF wave band is started.

In this example, if the driver has not yet gotten close to the vehicle at this point, the in-vehicle device 3 cannot yet receive the car finder signal. Thus, the control unit 32b of the in-vehicle device 3, while reading a program from the memory 32a and executing it for implementing a process shown in FIG. 4, determines that the car finder signal is not yet received by the RF reception unit 31 at 210, and repeats 210.

On the other hand, after the start of the transmission of the car finder signal by the control unit 25 at 130 (FIG. 3), the control unit 25 determines, at 140, whether a predetermined period (e.g., three seconds) has passed from the start of the transmission of the car finder signal. When the predetermined period has not passed, the control unit 25 determines whether a predetermined end condition is fulfilled at 150. For example, the predetermined end condition may be: a condition A in which a predetermined end period (e.g., 10 minutes) has passed from a first transmission of the car finder signal after a determination of the car finder instruction in 120; or a condition B in which a predetermined release operation on the input operation unit 21 is performed (e.g., a press of the lock/unlock button and a press of the panic button performed at the same time); or a condition C in which one of the conditions A or B is fulfilled. In this example, the condition C is adopted. When the end condition is not fulfilled, the control unit 25 returns to 140.

Therefore, after the start of the transmission of the car finder signal, the control unit 25 repeats 140 and 150 while the predetermined period has not passed and the predetermined end condition is not fulfilled. After the predetermined period (e.g., after three seconds) has passed, the control unit 25 returns to 130 and retransmits the wireless transmission of the car finder signal by using the RF transmission unit 23 by the above-described operation. In such manner, the car finder signal is again transmitted from the electronic key 2 to the in-vehicle device 3. Therefore, while the end condition is not fulfilled, the control unit 25 repeats the transmission of the car finder signal intermittently at a scheduled interval by using the control unit 25.

While the electronic key 2 repeats the transmission of the car finder signal, the user continues to move in search of the vehicle. While the in-vehicle device 3 cannot receive the car finder signal during such search of the vehicle, the control unit 32b of the in-vehicle device 3 repeats 210 of FIG. 4 because the user is too far from the vehicle. Therefore, during the search of the vehicle, the answerback operation (i.e., a notification toward an outside of the own vehicle) will not be performed. However, when the user comes close to the vehicle (e.g., within 10 meters from the vehicle) and allows the in-vehicle device 3 to receive the car finder signal, the control unit 32b determines in 210 that the control unit 32b has received the car finder signal, and proceeds to 220.

The control unit 32b determines whether the car finder signal includes the predetermined registered ID (i.e., a registered ID corresponding to the vehicle) at 220. The control unit 32b either proceeds to 230 if the registered ID is included therein or returns to 210 if the registered ID is not included. In this example, the registered ID is included, and the control unit 32b proceeds to 230.

The control unit 32b performs the answerback operation, for providing an external notification (i.e., an alert) from the vehicle one time (i.e., one episode of notification). The one episode of the answerback operation (i.e., the external notification) may be at least one of a hazard lamp blinking operation for blinking the hazard lamp 6 on and off for a predetermined number of times (e.g., once, twice etc.) and a horn blowing operation for blowing the sound blowing device 7 for a predetermined time (e.g., 0.5 seconds). In such manner, the user can recognize and confirm a parking position of the vehicle. The control unit 32b then returns to 210 from 230.

Figure 4:
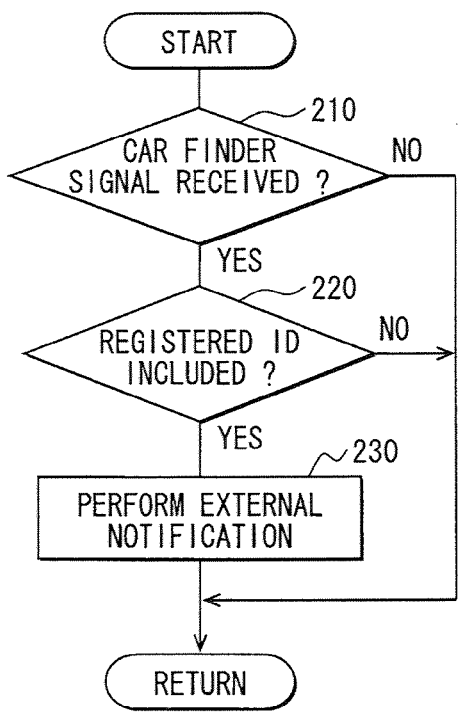
FIG. 4 is a flowchart of a process performed by an in-vehicle device of the car finder system.

According to FIG. 4, the control unit 32b of the in-vehicle device 3 performs one episode of a predetermined answerback operation (i.e., an external notification) whenever it receives the car finder signal from the electronic key 2. Further, when the car finder signal and the lock/unlock signal are the same signal, the process described above as performed by the control unit 32b in the lock/unlock operation of the door is the process in FIG. 4 itself. Further, when the car finder signal and the panic signal are the same signal, the process described above as performed by the control unit 32b in the panic operation is the process in FIG. 4 itself.

While the user is in the proximity of the vehicle (i.e., within a signal reception range of the car finder signal by the in-vehicle device 3), the car finder signal is transmitted from the electronic key 2 at the scheduled interval as long as the end condition is not fulfilled, and the in-vehicle device 3 performs the answerback operation each time it receives the car finder signal.

The user then performs a predetermined cancel operation on the input operation unit 21 of the electronic key 2. After such operation, the control unit 25 determines in 150 of FIG. 3 that the end condition is fulfilled (i.e., the condition C described above in this case is fulfilled), and returns to 110, thereby ending the repeated transmission of the car finder signal in 130. That is, the repeated transmission of the car finder signal is terminated according to the user operation. Further, the portable terminal 1 will not be required for the termination of the repeated transmission of the car finder signal.

Alternatively, in case a predetermined and period (e.g., 10 minutes) has elapsed with no car finder signal received by the in-vehicle device 3 after the start of repeated transmission of the signal, it is determined in 150 that the end condition is fulfilled, and the control unit 25 of the electronic key returns to 110 for terminating the repeated transmission of the car finder signal. In this case, when the predetermined end period runs out without finding the own vehicle, the repeated transmission of the car finder signal is automatically stopped. By providing such automatic ending function for ending the transmission of the car finder signal, it may be convenient for the user when the user has mistakenly performed a car finder instruction transmission operation, or when the user forgets to stop the repeated transmission of such signal, as well as other cases. Further, the portable terminal 1 will not be required for ending the repeated transmission of the car finder signal.

Based on the present disclosure, a wireless receiver, such as the NFC reception unit 22 of the electronic key 2, wirelessly receives a car finder instruction when the car finder instruction is transmitted from the portable terminal 1 based on a preset operation performed on the portable terminal 1. A wireless transmitter, such as control unit 25 and RF transmission unit 23 of the electronic key 2, wirelessly transmits the car finder signal to the in-vehicle device 3 in a repeated manner based on the car finder instruction received by the wireless receiver.

As described above, in the wirelessly-triggered car finder operation, the predetermined car finder instruction is wirelessly transmitted from the portable terminal 1 when the predetermined car finder operation is performed on the portable terminal 1, and the electric key 2 repeats the transmission of the car finder signal at the scheduled interval to the in-vehicle device 3 based on the reception of the car finder instruction from the portable terminal 1. The in-vehicle device 3 then performs the answerback operation when it receives the car finder signal from the electric key 2.

Therefore, when the user performs the predetermined operation only once on the portable terminal 1, the portable terminal 1 transmits the car finder instruction to the electronic key 2, and the electronic key 2 automatically repeats the transmission of the car finder signal to the in-vehicle device 3. Thus, when the user tries to find the vehicle while moving around, the user is required to perform the predetermined operation on the portable terminal 1 only once, without having to repeat the same operation thereafter, i.e., the repeat of which conventionally required for every few steps in the prior system.

In other words, once the repeated transmission of the car finder signal from the electric key 2 is started by the predetermined operation on the portable terminal 1, the car finder signal repeatedly transmitted from the electric key 2 is received by the in-vehicle device 3 for the external notification from the vehicle when the user comes close to the vehicle. Therefore, the car finder system of the present disclosure allows the user to find the parking position of the vehicle in a more convenient and hassle-free manner in comparison to the conventional system.

Further, when the portable terminal 1 is implemented as a smart phone, such device usually equipped with the NFC communication function enables an easy implementation of the wirelessly-triggered car finder operation by using the smart phone type cellular phone.

In the present disclosure, the NFC reception unit 22 may be an example of a wireless reception unit in claims, and the RF transmission unit 23 and the control unit 25 may be an example of a wireless transmission unit in claims.

Other Embodiments

Although the current disclosure has been fully described with reference to the accompanying drawings, it is to be noted that various changes and modifications will become apparent to those skilled in the art. The following modifications may also pertain to the scope of the present disclosure.

In the above embodiment, the electronic key 2 is a vehicular portable device for a key-less entry system, allowing the user to lock and unlock the door of the vehicle by sending the lock/unlock signal according to the user operation.

However, the electronic key 2 may be a vehicular portable device used for a smart entry. In such case, the in-vehicle device 3 may be configured to regularly transmit a first request signal in the LF (i.e., Low Frequency) wave band by using the LF transmitter. The control unit 25 of the electronic key 2 may be configured to receive the first request signal by using an LF reception unit when the electronic key 2 is brought into a signal reception range (e.g., a range of 3 meters from an antenna that transmits the first request signal), and to generate a first answer signal and to transmit the first answer signal from the RF transmission unit 23. The control unit 32b of the in-vehicle device 3 may be configured to unlock the door based on the reception of the first answer signal by the RF reception unit 31. In such a case, after the reception of the first answer signal, the electronic key 2 and the in-vehicle device 3 may be configured to exchange a second request signal and a second answer signal, and may be configured to further exchange a third request signal and a third answer signal, before unlocking the door.

When the electronic key 2 is a vehicular portable device for a smart entry, the end condition in 150 of FIG. 3 may be defined as a condition that the LF reception unit has received the first request signal (i.e., an example of a predetermined cancellation signal). In such manner, upon detecting that the electronic key 2 is brought into an effective range of the smart entry which unlocks the door, the repeated transmission of the car finder signal may be automatically terminated.

Further, the input operation unit 21 of the electronic key 2 in the above embodiment, having one button commonly used for locking and unlocking the door, may have a different configuration. For example, the input operation unit 21 of the electronic key 2 may have a lock button for locking the door and an unlock button for unlocking the door. In such a case, the lock button may be pressed to transmit the lock signal from the electronic key 2, leading to the lock of the door if it is unlocked and to the answerback operation (i.e., an external notification) by the in-vehicle device 3. The unlock button may be pressed to transmit the unlock signal from the electronic key 2, leading to the unlock of the door if it is locked and to the answerback operation (i.e., an external notification) by the in-vehicle device 3. Accordingly, the car finder signal may be the same as the lock signal, and/or may be the same as the unlock signal, or may be different from both of the lock signal and the unlock signal.

Further, the electronic key 2 described above may be formed as a device having no input operation unit for receiving a user operation. In such a case, the electronic key 2 may be a dedicated communication device for a wirelessly-triggered car finder operation.

Such changes and modifications are to be understood as being within the scope of the current disclosure as defined by the appended claims.

What is claimed is:

1. A communication device carried by a user for communicating with a portable terminal carried by the user and for communicating with an in-vehicle device disposed in a vehicle and that provides an external notification based on a preset car finder signal transmitted by the communication device, the communication device comprising:
    a wireless receiver wirelessly receiving a car finder instruction transmitted from the portable terminal based on a preset operation performed on the portable terminal; and
    a wireless transmitter wirelessly transmitting the preset car finder signal to the in-vehicle device in a repeated manner based on the car finder instruction received by the wireless receiver.

2. The communication device of claim 1, wherein
    the wireless receiver receives the car finder instruction from the portable terminal by communicating with the portable terminal according to a near field communication standard, such that the portable terminal serves as a sender of the car finder instruction.

3. The communication device of claim 1, wherein
    the wireless transmitter starts a repeated transmission of the preset car finder signal based on the car finder instruction received by the wireless receiver, and ends the repeated transmission of the preset car finder signal after a preset time has lapsed from the reception of the car finder instruction.

4. The communication device of claim 1 further comprising:
an input operation unit operable by the user, wherein
the wireless transmitter starts a repeated transmission of the preset car finder signal based on the car finder instruction received by the wireless receiver, and ends the repeated transmission of the preset car finder signal based on a preset operation performed on the input operation unit.

5. The communication device of claim 1, wherein
the wireless transmitter starts a repeated transmission of the preset car finder signal based on the car finder instruction received by the wireless receiver, and ends the repeated transmission of the preset car finder signal based on a preset cancel signal from the in-vehicle device of the vehicle.

6. A car finder system comprising:
an in-vehicle device disposed in a vehicle;
a portable terminal wirelessly transmitting a car finder instruction based on a preset operation performed by a user; and
a communication device including a wireless receiver and a wireless transmitter, the wireless receiver wirelessly receiving the car finder instruction transmitted from the portable terminal based on the preset operation performed on the portable terminal, and the wireless transmitter wirelessly transmitting a preset car finder signal to the in-vehicle device in a repeated manner based on the car finder instruction received by the wireless receiver, wherein
the in-vehicle device provides an external notification when it receives the preset car finder signal from the communication device.

7. The car finder system of claim 6, wherein
the wireless receiver of the communication device receives the car finder instruction from the portable terminal by communicating with the portable terminal according to a near field communication standard, such that the portable terminal serves as a sender of the car finder instruction.

8. The car finder system of claim 6, wherein
the wireless transmitter of the communication device starts a repeated transmission of the preset car finder signal based on the car finder instruction received by the wireless receiver, and ends the repeated transmission of the preset car finder signal after a preset time has lapsed from the reception of the car finder instruction.

9. The car finder system of claim 6 further comprising:
an input operation unit operable by the user, wherein
the wireless transmitter of the communication device starts a repeated transmission of the preset car finder signal based on the car finder instruction received by the wireless receiver, and ends the repeated transmission of the preset car finder signal based on a preset operation performed on the input operation unit.

10. The car finder system of claim 6, wherein
the wireless transmitter starts a repeated transmission of the preset car finder signal based on the car finder instruction received by the wireless receiver, and ends the repeated transmission of the preset car finder signal based on a preset cancel signal from the in-vehicle device of the vehicle.

11. The car finder system of claim 6, wherein the wireless transmitter wirelessly transmits the preset car finder signal to the in-vehicle device intermittently in the repeated manner.

12. The car finder system of claim 6, wherein the wireless transmitter automatically transmits the preset car finder signal in the repeated manner.

13. The car finder system of claim 6, wherein the preset operation of the user is performed once to cause the wireless transmitter to wirelessly transmit the preset car finder signal in the repeated manner.

14. The car finder system of claim 6, wherein the wireless transmitter automatically repeats the transmission of the preset car finder after a predetermined period of time.

15. The car finder system of claim 1, wherein the wireless transmitter wirelessly transmits the preset car finder signal to the in-vehicle device intermittently in the repeated manner.

16. The car finder system of claim 1, wherein the wireless transmitter automatically transmits the preset car finder signal in the repeated manner.

17. The car finder system of claim 1, wherein the preset operation is performed once to cause the wireless transmitter to wirelessly transmit the preset car finder signal in the repeated manner.

18. The car finder system of claim 1, wherein the wireless transmitter automatically repeats the transmission of the preset car finder after a predetermined period of time.

* * * * *